H. RICHARDSON.
AUTOMATIC WEIGHING MACHINE.
APPLICATION FILED MAR. 24, 1910.

1,006,879.

Patented Oct. 24, 1911.

2 SHEETS—SHEET 1.

Witnesses:

Inventor
Henry Richardson

H. RICHARDSON.
AUTOMATIC WEIGHING MACHINE.
APPLICATION FILED MAR. 24, 1910.

1,006,879.

Patented Oct. 24, 1911.

2 SHEETS—SHEET 2.

Witnesses:

Inventor
Henry Richardson

UNITED STATES PATENT OFFICE.

HENRY RICHARDSON, OF NEW YORK, N. Y.

AUTOMATIC WEIGHING-MACHINE.

1,006,879.  Specification of Letters Patent.  Patented Oct. 24, 1911.

Application filed March 24, 1910. Serial No. 551,346.

*To all whom it may concern:*

Be it known that I, HENRY RICHARDSON, a subject of the King of Great Britain, residing at New York, in the county of New York and State of New York, have invented certain new and useful Improvements in Automatic Weighing-Machines, of which the following is a specification.

My present invention relates to improvements in weighing machines and is especially applicable to those of the type wherein the bulk of the material is fed to the weigh hopper by a loading stream and the poising or balancing is effected by a drip or smaller stream, and the object of the present invention is to provide in a machine of this type, mechanism for automatically compensating for the weight of the suspended column of material falling into the weigh hopper according to the specific gravities of different materials and also for drip streams of different volumes due to irregularities in the feed of the material to the machine or to other causes, to the end that the machine will be capable of accurately performing the weighing operations and without requiring special adjustments of the machine whenever materials of different specific gravities are handled.

To these and other ends, the invention consists in certain improvements, and combinations and arrangements of parts, all as will be hereinafter more fully described, the novel features being pointed out particularly in the claims at the end of the specification.

Figure 1:
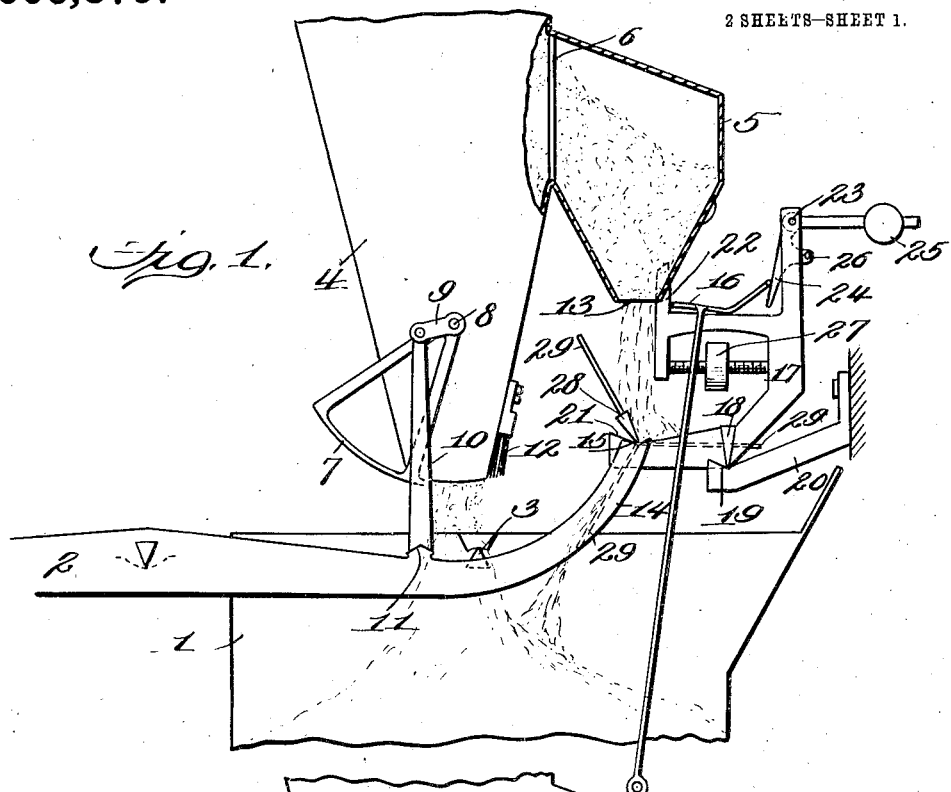
Figure 2:
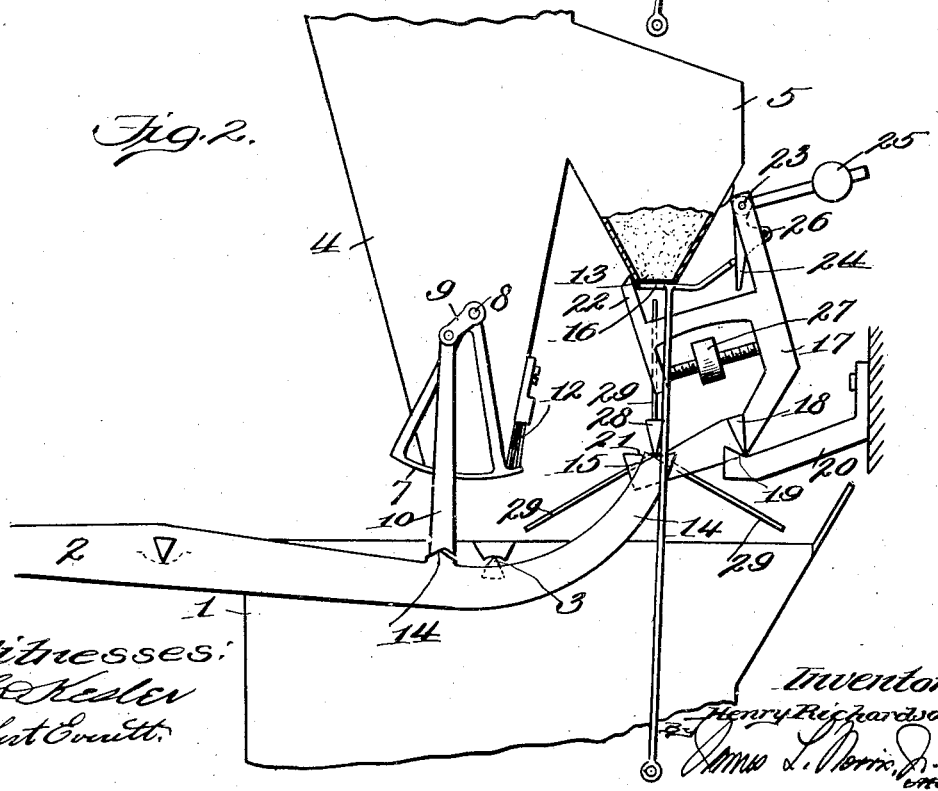
Figure 3:
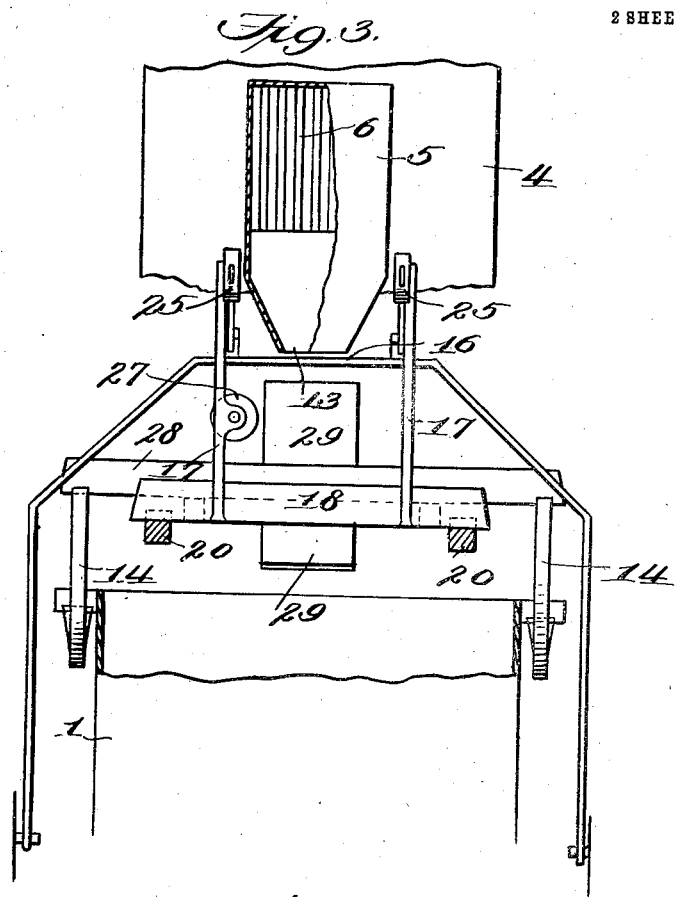
Figure 4:
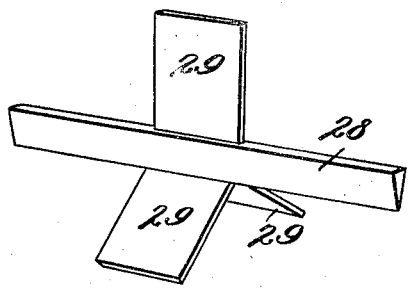

In the accompanying drawing: Figure 1 is a diagrammatic view of a weighing machine equipped with an automatic compensator constructed in accordance with the present invention, the parts being shown in the positions they occupy while the weigh hopper is being loaded; Fig. 2 is a view similar to Fig. 1 showing the weigh hopper, however, in settled or poised position with the loading and drip streams cut off; Fig. 3 represents an end view of the machine as shown in Figs. 1 and 2, the same being viewed from the right and a portion of the drip stream hopper being broken away to show the grid; and Fig. 4 is a perspective view of the oscillator upon which the drip stream acts during the final step in the weighing operation.

Similar parts are designated by the same reference characters in the several views.

An automatic compensator according to the present invention may be used generally in connection with weighing machines of the type above specified. In the accompanying drawing, I have shown one embodiment of the invention applied to a weighing machine of the general type disclosed in certain of my prior patents. It will be understood, however, that the form of compensator shown in the drawing is but one example of the invention, and that certain modifications and changes may be made therein in order that the invention may be applied to the best advantage according to the particular kind of weighing machine or the general character of the different materials which such machine is to handle. In the present instance, 1 designates the ordinary weigh hopper which is suspended in the usual manner upon a counterweighted beam 2 through the medium of the knife-edge bearings 3. The material is supplied to the weigh hopper in the present instance through a main feed hopper 4 and an auxiliary or drip feed hopper 5, the latter communicating with the main supply hopper 4, and a grid 6 is preferably interposed between the two hoppers so as to prevent lumps of material or trash from entering the hopper 5 which, in the example shown, supplies a drip stream. The bulk of the material is loaded into the weigh hopper through the outlet in the bottom of the main supply hopper 4, and such outlet is controlled by a suitable valve 7 which is shown as pivoted at 8 to a suitable part of the main supply hopper, and this valve is preferably provided with suitable mechanism controlled by the settling of the weigh beam whereby such valve will close to cut off the main or loading stream upon the first settling movement of the weigh beam. A conventional illustration of such mechanism consists in the present instance of a crank 9 which is turnable with the valve and is provided with a pendant 10, the lower end of which has a seat to receive a beveled controlling projection 11 formed on or movable with the weigh beam whereby a settling of this beam will allow the pendant also to settle and will thereby allow the valve 7 to move into closed position. A brush 12 is shown attached to the main supply hopper 4 at a point adjacent to its outlet, this brush being adapted to coöperate with the forward edge of the valve 7 and thereby cut off the main feed with a minimum friction and also permitting this valve to close even though foreign matter may reach the valve.

The auxiliary or drip feed hopper 5 is provided with an outlet 13 which is of a size smaller than that through which the main or loading stream passes, the drip stream serving to complete the load in the weigh hopper. The weigh hopper upon receiving an approximate load will produce a preliminary settling of the weigh beam, thus allowing the valve or gate 7 to close and cut off or interrupt the main or loading stream. In order to insure the greatest accuracy in the weighing operation and to compensate for the actual weight of the falling column of material of the drip stream, irrespective of the varying specific gravities of different materials, I provide a novel mechanism which is controlled by the weigh beam and serves to automatically cut off the drip stream the moment the mechanism reaches a poise. Devices of different specific construction may be used for obtaining these results. In the present instance, I provide the weigh beam with an extension 14 which is beyond the knife-edge bearing upon which the weigh hopper is suspended, this extension of the weigh beam having a knife-edge bearing 15. The cut-off valve 16 for the drip stream is suitably mounted in coöperative relation to the outlet 13 of the auxiliary supply hopper 5, and this drip stream valve is controlled and actuated by a tripper which in the instance shown comprises a frame 17 having a knife-edge 18 which rests upon a pair of knife-edge bearings 19 formed upon stationary brackets 20, and this frame 17 is also provided with a pair of knife-edge bearings 21 which are adapted to normally rest in approximate alinement with the knife-edge bearings 15 upon the extensions 14 of the weigh beam. The upper portion of the frame 17 coöperates with the drip stream valve 16 so as to move the latter into closing and opening positions. In order that this frame 17 may perform such functions, it is provided at its forward edge with upward extensions 22 which are adapted to coöperate with the forward edge of the valve 16, and as the frame 17 is rocked rearwardly upon the knife-edge 18 as an axis, it will carry the drip valve 16 into open position. This tiltable frame 17 also carries the drip stream valve 16 into closed position under the control of the weigh beam. In order to avoid any possibility of foreign matter which might clog the valve from preventing operation of the tiltable or rocking frame 17, I provide a yielding connection between the valve and the frame. This yielding connection consists in the present instance of a shaft 23 which is pivoted in the upper portion of the frame 17 and carries a pair of arms 24 which arms rest against the rear edge of the valve 16. These arms 24 are yieldingly held against the rear edge of the valve by a weight 25. A projection 26 serves to prevent the arms 24 from pressing too firmly against the valve when such arms are in their normal position. The frame 17 is provided with a weight 27 which is adjustable toward opposite sides of the knife-edge 18 whereby the top-heaviness of the tripping frame may be properly regulated.

As previously stated, the operation of the tripping frame which serves to operate the tripping valve is under the control of the weigh beam and the latter in turn is under the control of the drip stream. Devices of different kinds may be used to receive the impact of the drip stream, it being preferable according to the present invention to provide a device which will receive the impact of the falling drip stream column but will automatically empty or free itself of such material. In the present instance, I provide an oscillator which is composed of a knife-edge 28 which is of a length sufficient to span and rest upon the knife-edge bearings 15 of the weigh beam extensions and the knife-edge bearings 21 of the tripping frame, and this knife-edge 28 has a suitable number of blades 29 rigidly attached thereto and arranged in radiating relation. In the present instance, a set of three blades is shown and after one blade has received a certain amount of material, the oscillator will rock into a reverse position so as to dump such material and then load another charge upon the opposite blade, this operation continuing until the load has been finally made up at which time the impact of the drip stream upon the oscillator will act upon the weigh beam and also upon the tripping frame 17, the counterbalance upon the weigh beam being overcome so that the weigh beam can settle, and owing to the bearing that the oscillator has upon the tripping frame 17, the latter will also be rocked so that its center of gravity passes over the knife-edge 18, whereupon the tripping frame will fall forward into the position shown in Fig. 2, carrying the drip valve 16 into closed position.

In operation, the bulk of the load is made up in the weigh hopper by the loading stream from the supply hopper 4 and also the drip stream from the auxiliary supply hopper 5. After a predetermined amount of material has been fed to the weigh hopper, the weigh beam will settle to an extent sufficient to permit the valve 7 to close and thereby cut off the main or loading stream. This preliminary settling of the weigh beam, however, will not be of an extent sufficient to set the tripping frame 17 into operation, so that the drip stream will continue until the full load is made up. When the weighing operation has progressed to a point where the impact of the falling column of material of the drip stream upon the oscillator is sufficient to overcome the counterbalance and cause a further settling of the weigh beam, the tripping frame will be carried into a position that will permit it to tilt or rock in the manner hereinbefore described whereby the controlling valve for the drip stream is carried into closed position. As the impact of the falling column of material of the drip stream is dependent upon two factors, namely, the specific gravity of the material and also the volume thereof, it results that the mechanism will compensate automatically for materials of different densities and, moreover, accurate weighing operations are insured even though the material may be supplied irregularly to the auxiliary supply hopper and thereby vary the volume of the drip stream.

I claim as my invention:

1. In a weighing machine, the combination of a weigh hopper and beam, a supply hopper, means for controlling the discharge of material therefrom, and a compensator for controlling the operation of said discharge controlling means, such compensator being influenced by a column of material falling from the supply hopper and arranged to act upon the weigh beam with a force varying according to the weight of such column of material.

2. The combination of a weighing machine having a weigh hopper and beam, a supply hopper and a controlling valve or gate for the latter, and valve-closing means including a compensator mounted to be acted on by a column of material falling from the supply hopper and to act upon the weigh beam with a pressure varying according to the weight of such falling column.

3. In a weighing machine, the combination of a weigh hopper and weigh beam, a supply hopper and valve, valve-closing means, and a controlling device for the valve-closing means arranged to receive material from the supply hopper and movable to empty itself of such material, said device being adapted to exert a pressure upon the weigh beam.

4. In a weighing machine, the combination of a weigh hopper and a weigh beam, a supply hopper provided with a controlling valve, means for closing said valve, and a device operatively associated with the weigh beam and said valve-closing means and adapted to exert a pressure upon the weigh beam which varies according to the weight of the material falling from the supply hopper.

5. In a weighing machine, the combination of a weigh hopper and a weigh beam, a supply hopper provided with a controlling valve, means for closing such valve, and a device forming a connection between the weigh beam and said valve-closing means, said device being located to receive the impact of a column of material falling from the supply hopper.

6. In a weighing machine, the combination of a weigh hopper and weigh beam, a supply hopper provided with a controlling valve, means for closing such valve, and a bladed oscillator located in the path of a column of material falling from said supply hopper, said device having an operative connection with the valve-closing means and also having a bearing upon the weigh beam.

7. In a weighing machine, the combination of a weigh hopper and weigh beam, a supply hopper provided with a controlling valve, a tripper for closing said valve, and an oscillator having a plurality of blades arranged to alternately receive the impact of a column of material falling from said supply hopper, the oscillator also having bearings upon the tripper and the weigh beam.

8. In a weighing machine, the combination of a weigh hopper and weigh beam, means for feeding material to the weigh hopper by loading and drip streams, a valve controlled by the weigh beam for cutting off the loading stream, a valve for cutting off the drip stream, a tripper for closing the drip stream valve, and a compensator located to receive the impact of the drip stream and acting mutually upon the weigh beam and the tripper.

9. In a weighing machine, the combination of a weigh hopper and weigh beam, a supply hopper provided with a controlling valve, a tiltably supported tripper operative to open and close said valve, and an automatic compensator located to receive the impact of a column of material falling from said supply hopper and having a mutual bearing upon the weigh beam and the tiltable tripper.

10. In a weighing machine, the combination of a weigh hopper and weigh beam, a supply chute provided with a controlling valve, a tiltable tripping frame coöperative with said valve for opening and closing it, a regulating weight for adjusting the center of gravity of said frame with respect to its pivotal center, and an automatic compensator adapted to be acted on by a column of material falling from the weigh hopper and having a mutual bearing upon the weigh beam and tripping frame.

11. In a weighing machine, the combination of a weigh hopper and weigh beam, a supply hopper provided with a controlling valve, a tiltably mounted tripping frame carrying means for yieldably acting on said valve to close it, and an automatic compensator adapted to be acted on by a column of material falling from said supply hopper and normally having a bearing upon the weigh beam and tripping frame.

In testimony whereof I have hereunto set my hand in presence of two subscribing witnesses.

HENRY RICHARDSON.

Witnesses:
　ISABEL HASBROUCK,
　PETER VANDERHOEFF.